United States Patent
Kawano

(10) Patent No.: US 8,153,093 B2
(45) Date of Patent: Apr. 10, 2012

(54) PROCESS FOR PRODUCING CARBONATE PARTICLES

(75) Inventor: Tetsuo Kawano, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 583 days.

(21) Appl. No.: 11/628,867

(22) PCT Filed: Jun. 1, 2005

(86) PCT No.: PCT/JP2005/010071
§ 371 (c)(1),
(2), (4) Date: Jan. 31, 2008

(87) PCT Pub. No.: WO2005/121024
PCT Pub. Date: Dec. 22, 2005

(65) Prior Publication Data
US 2008/0267854 A1    Oct. 30, 2008

(30) Foreign Application Priority Data
Jun. 8, 2004    (JP) ................................ 2004-170456

(51) Int. Cl.
C01F 5/24          (2006.01)
C01B 31/24         (2006.01)
(52) U.S. Cl. .................. 423/430; 423/419.1; 423/415.1
(58) Field of Classification Search .................. 423/414, 423/415.1, 419.1, 430
See application file for complete search history.

(56) References Cited

U.S. PATENT DOCUMENTS
5,164,172 A      11/1992  Katayama et al.
2004/0253170 A1*  12/2004  Zhou et al. ................. 423/592.1

FOREIGN PATENT DOCUMENTS
FR    1 151 566 A    1/1958
(Continued)

OTHER PUBLICATIONS
Sondi et al (Homogeneous Precipitation, Chem. Mater. 2003, 15, 1322-1326).*

(Continued)

Primary Examiner — Melvin Mayes
Assistant Examiner — Bijay Saha
(74) Attorney, Agent, or Firm — Buchanan Ingersoll & Rooney PC

(57) ABSTRACT

To provide a process for producing carbonate particles, capable of efficient, easy formation of carbonate particles which have high crystallinity, less prone to agglomeration and offer orientation birefringence, particularly carbonate particles that are needle- or rod-shaped, and of controlling the particle size. In the process a metal ion source and a carbonate ion source are heated together in a liquid of 55° C. or higher for reaction to produce carbonate particles with an aspect ratio of greater than 1, wherein the metal ion source contains at least one metal ion selected from the group consisting of $Sr^{2+}$, $Ca^{2+}$, $Ba^{2+}$, $Zn^{2+}$ and $Pb^{2+}$. The carbonate particles are preferably needle- or rod-shaped, pH of the liquid after heating reaction is preferably 8.20 or more, and in its X-ray diffraction spectrum the full-width at half maximum of the diffraction peak corresponding to (111) plane is preferably less than 0.8°.

8 Claims, 5 Drawing Sheets

FOREIGN PATENT DOCUMENTS

| | | |
|---|---|---|
| JP | 59-203728 A | 11/1984 |
| JP | 01-167216 A | 6/1989 |
| JP | 05-155615 A | 6/1993 |
| JP | 06-318432 A | 11/1994 |
| JP | 06-345424 A | 12/1994 |
| WO | 01/25364 A1 | 4/2001 |

OTHER PUBLICATIONS

Sond et al (Homogeneous Precipitation, Chem Matter, 2003, 15, 1322-1326).*

Official Action dated May 10, 2011, issued by the Japanese Patent Office in corresponding application No. 2005-158082, and partial English language translation of the Official Action.

L. Wang: "Preparation of Uniform Needle-Like Aragonite Particles by Homogeneous Precipitation", Journal of Colloid and Interface Science, vol. 218, No. 2, Oct. 15, 1999, pp. 545-553.

Supplementary European Search Report (SESR) issued Nov. 7, 2011 in corresponding European Application No. EP 05745819.2.

* cited by examiner

PROCESS FOR PRODUCING CARBONATE PARTICLES

TECHNICAL FIELD

The present invention relates to a process for producing carbonate particles, which the process capable of efficient, easy formation of carbonate particles having high crystallinity, are less prone to agglomeration and offer orientation birefringence, particularly carbonate particles that are needle- or rod-shaped, and of controlling the particle size.

BACKGROUND ART

Carbonates (e.g., calcium carbonate) have been widely used in various fields including rubber, plastic, and paper. In recent years high-performance carbonates have been increasingly developed and are used for many purposes according to their specific features such as particle shape and diameter.

Calcite, aragonite and vaterite are the examples of the crystalline forms of carbonate. Of the three, aragonite is useful in many applications because it is composed of needle-shaped particles and thereby offers excellent strength and elastic modulus.

For example, generally known processes for carbonate production are: a process in which carbonate ion-containing solution is reacted with chloride-containing solution; and a process in which a chloride is reacted with carbonic acid gas. In addition, there are processes that are proposed for the production of needle-shaped carbonates with an aragonite-like structure: a process in which carbonate ion-containing solution is reacted with chloride-containing solution under application of ultrasonic wave (see Patent Literature 1); and a process for introducing carbon dioxide into aqueous slurry of $Ca(OH)_2$, in which the process a needle-shaped aragonite crystal is previously introduced in the aqueous slurry as a seed crystal followed by growing of the seed crystal in a given direction (see Patent Literature 2).

The production process disclosed in Patent Literature 1, however, has a problem that its use results in the formation of large carbonate particles of 30-60 µm in length with a broader particle size distribution, which makes it impossible to produce carbonate particles with a desired, controlled size. Also, the use of the production process disclosed in Patent Literature 2 merely results in the formation of large carbonate particles of 20-30 µm in length.

Meanwhile, there is a strong tendency in recent years that polymer resins are increasingly used for general optical components (e.g., glass lenses and transparent plates) and optical components designed for optoelectronics, particularly for materials of optical components of laser-related devices used for instance in optical disc apparatus for recording of sounds, pictures, texts, etc. One of the reasons for this is that optical polymer materials (optical materials made of polymer resin) are generally excellent in terms of lightness, cost, formability and productivity compared to other optical materials such as optical glass. In addition, polymer resins are advantageous because molding techniques, such as extrusion molding or injection molding, can be readily applied.

However, molded articles formed from such conventional, general optical polymer material by means of any of the molding techniques are known to show birefringence. Although polymer materials that offer birefringence are not especially problematic when used in optical elements that do not require so high optical precision, there is a high demand in recent years for high-precision optical articles. For example, birefringence causes a serious problem in rewritable magneto optical discs. That is, since such a magneto optical disc utilizes a polarized beam as a reading or a recording beam, the presence of a birefringent element (e.g., the disc itself or a lens) in an optical path affects the precision of reading or recording of information.

To reduce the degree of birefringence to avoid this problem, there is proposed a non-birefringent optical resin material formed from inorganic particles and polymer resin, the birefringence values of which are of opposite sign (see Patent Literature 3). The optical resin material is prepared by the process called crystal doping. More specifically, a number of inorganic particles are dispersed in polymer resin, and a molding force is applied from the outside by drawing or the like, allowing linking chains present in the polymer resin and the inorganic particles to align in a direction that is substantially parallel to each other, so that the birefringence due to the optical anisotropy of the linking chains is canceled by the birefringence of the inorganic particles, which the value is the opposite sign.

In a case where a non-birefringent optical resin material is to be prepared by crystal doping, it is imperative to adopt inorganic particles that are applicable to crystal doping. It is recognized that fine carbonate particles that have needle or rod shapes are particularly suitable for such inorganic particles.

(Patent Literature 1) Japanese Patent Application Laid-Open (JP-A) No. 59-203728)
(Patent Literature 2) U.S. Pat. No. 5,164,172
(Patent Literature 3) International Publication No. WO 01/25364

DISCLOSURE OF THE INVENTION

It is an object of the present invention to provide process for producing carbonate particles, which the process capable of efficient, easy formation of carbonate particles which have high crystallinity, are less prone to agglomeration and offer an orientation birefringence, particularly carbonate particles that are needle- or rod-shaped, and of controlling the particle size.

The present inventor has conducted extensive studies to overcome the foregoing problems and established that by heating together a metal ion source containing metal ion(s) such as $Sr^{2+}$ and/or $Ca^{2+}$ and a carbonate ion source such as urea in liquid of 55° C. or higher for reaction, it is possible to efficiently and readily produce carbonate particles which are less prone to agglomeration and have an aspect ratio of greater than 1, particularly carbonate particles that are needle- or rod-shaped, while controlling their particle size.

The present invention has been accomplished based on the foregoing findings of the present inventor. The means to overcome the foregoing problems are as follows:

<1> A process for producing carbonate particles, including: heating together a metal ion source and a carbonate ion source in a liquid of 55° C. or higher for reaction to produce carbonate particles with an aspect ratio of greater than 1, wherein the metal ion source contains at least one metal ion selected from the group consisting of $Sr^{2+}$, $Ca^{2+}$, $Ba^{2+}$, $Zn^{2+}$ and $Pb^{2+}$. In the process according to <1> the metal ion source and carbonate ion source are heated in a liquid of 55° C. or high for reaction. As a result, carbonate particles are produced that are highly crystalline, less prone to agglomeration, and have an aspect ratio of greater than 1.

<2> The process for producing carbonate particles according to <1>, wherein the carbonate particles are needle- or rod-shaped. In the process according to <2> carbonate particles that are needle- or rod-shaped are produced, which can be used for many applications including non-birefringent optical resin materials.

<3> The process for producing carbonate particles according to one of <1> and <2>, wherein the metal ion source contains at least one of $NO_3^-$, $Cl^-$ and $OH^-$.

<4> The process for producing carbonate particles according to any one of <1> to <3>, wherein the carbonate ion source is urea. In the process according to <4> urea is thermally decomposed to produce carbon dioxide, which is converted into $CO_3^{2-}$ ions to react with anions to produce carbonate particles.

<5> The process for producing carbonate particles according to any one of <1> to <4>, wherein the liquid contains water.

<6> The process for producing carbonate particles according to any one of <1> to <5>, wherein the liquid contains a solvent. In the process according to <6> a solvent is contained. For this reason, the solubility of the resulting carbonate can be reduced.

<7> The process for producing carbonate particles according to <6>, wherein the solvent is at least one selected from the group consisting of methanol, ethanol, and isopropyl alcohol.

<8> The process for producing carbonate particles according to any one of <1> to <7>, wherein the pH of the liquid after heating reaction is 8.20 or more. Since the pH of the liquid after heating reaction is 8.20 or more—the alkali range—in the process according to <8>, the resultant carbonate is fine crystals.

<9> The process for producing carbonate particles according to any one of <1> to <8>, wherein in an X-ray diffraction spectrum of the carbonate particles, the full-width at half maximum of the diffraction peak corresponding to (111) plane is less than 0.8°. Since the full-width at half maximum of the diffraction peak corresponding to (111) plane is less than 0.8° in the process according to (9), the resulting carbonate particles offer excellent crystallinity.

According to the present invention, it is made possible to solve the foregoing conventional problems and to provide a process for producing carbonate particles, which the process capable of efficient, easy formation of carbonate particles which have high crystallinity, are less prone to agglomeration and offer orientation birefringence, particularly carbonate that are needle- or rod-shaped, and of controlling the particle size.

BEST MODE FOR CARRYING OUT THE INVENTION (Process for Producing Carbonate Particles)

The process of the present invention for producing carbonate particles is a process in which a metal ion source and a carbonate ion source are reacted together in liquid of 55° C. or higher to produce carbonate particles with an aspect ratio of greater than 1.

—Metal Ion Source—

The metal ion source is not particularly limited as long as it contains metal ion(s) and can be appropriately selected depending on the intended purpose; however, those that produce a carbonate with a crystalline form of any of calcite, aragonite and vaterite or amorphous form by reaction with the carbonate ion source are preferable. Among these, metal ion sources that produce a carbonate with an aragonite-type crystal structure are most preferable.

The crystal structure of the aragonite type-carbonate is represented by the $CO_3^{2-}$ unit, which are agglomerated one after another to form carbonate particles having needle- or rod-shapes. Thus, when the carbonate is drawn in a given direction by a drawing process to be described later, crystals are arranged with the longitudinal axes of the particles being parallel to the stretch direction.

Table 1 shows refractive indexes of some aragonite-type minerals. As shown in Table 1, carbonates with the aragonite-type crystal structure all have larger birefringence δ. Thus, they are preferably doped into polymers that offer orientation birefringence.

TABLE 1

|  | α | β | γ | δ | Specific Density |
|---|---|---|---|---|---|
| $CaCO_3$ | 1.530 | 1.681 | 1.685 | 0.155 | 2.94 |
| $SrCO_3$ | 1.520 | 1.667 | 1.669 | 0.149 | 3.75 |
| $BaCO_3$ | 1.529 | 1.676 | 1.677 | 0.148 | 4.29 |
| $PbCO_3$ | 1.804 | 2.076 | 2.078 | 0.274 | 6.55 |

The metal ion source is not particularly limited as long as it contains at least one metal ion selected from the group consisting of $Sr^{2+}$, $Ca^{2+}$, $Ba^{2+}$, $Zn^{2+}$ and $Pb^{2+}$, and can be appropriately selected depending on the intended purpose; examples include nitrates, chlorides, hydroxides, etc., of at least one metal selected from the group consisting of Sr, Ca, Ba, Zn and Pb.

The metal ion source preferably contains at least one of $NO_3^-$, $Cl^-$ and $OH^-$. Thus suitable specific examples of the metal ion source include $Sr(NO_3)_2$, $Ca(NO_3)_2$, $Ba(NO_3)_2$, $Zn(NO_3)_2$, $Pb(NO_3)_2$, $SrCl_2$, $CaCl_2$, $BaCl_2$, $ZnCl_2$, $PbCl_2$, $Sr(OH)_2$, $Ca(OH)_2$, $Ba(OH)_2$, $Zn(OH)_2$, $Pb(OH)_2$, and hydrates thereof.

—Carbonate Ion Source—

The carbonate ion source is not particularly limited as long as it produces $CO_3^{2-}$ ion and can be appropriately selected depending on the intended purpose; suitable examples include urea (($NH_2$)$_2$CO), ammonium carbonate (($NH_4$)$_2$$CO_3$), sodium carbonate ($Na_2CO_3$) and carbonic acid gas. Among these carbonate ion sources, urea is most preferable.

—Heating Reaction—

Figure 1:
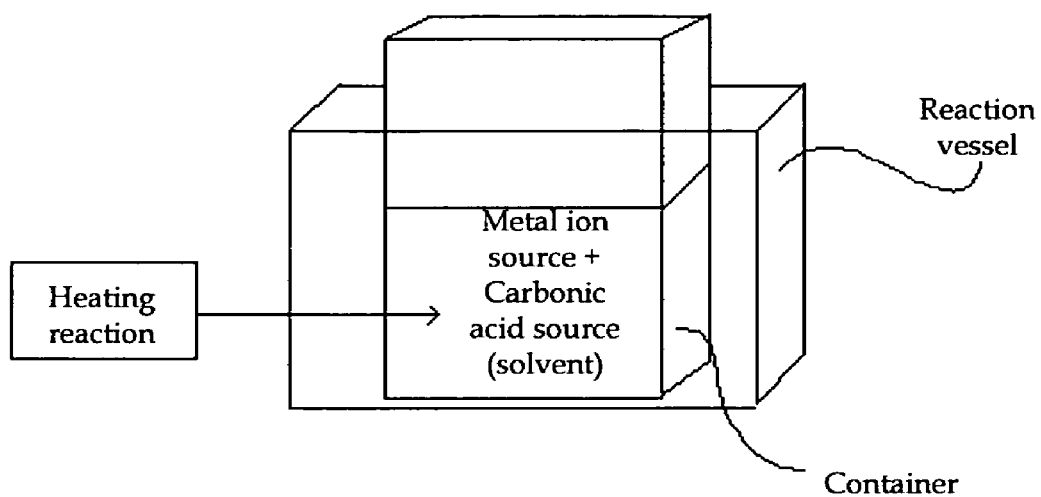
FIG. 1 is a conceptual view for explaining an example of the process of the present invention for producing carbonate particles.

The method of heating reaction is not particularly limited and can be appropriately selected depending on the intended purpose. An example is a method of placing into a reaction vessel a container supplied with a metal ion source and a carbonate ion source and keeping the container hot, as shown in FIG. 1. The heating reaction is preferably conducted under the condition described below.

That is, it is required that the reaction temperature in the heat reaction be 55° C. or higher, preferably 60° C. to 95° C. and, more preferably, 70° C. to 90° C. A reaction temperature of less than 55° C. results in low crystallinity and in failure to obtain carbonate particles that are needle- or rod-shaped, thereby producing carbonate particles that are spherical or oval.

The reaction time is not particularly limited and can be appropriately set depending on the intended purpose; however, the reaction time is preferably 15 minutes to 360 minutes, more preferably 30 minutes to 240 minutes.

The heating reaction is preferably conducted with agitation, and the agitation speed is preferably 500 rpm to 1,500 rpm.

The pH of the liquid after the heating reaction, or reaction liquid, is preferably 8.20 or more. A pH value of less than 8.20 may result in the formation of coarse carbonate particles, whereas a pH value of 8.20 or greater and in a high pH (alkali) range results in fine carbonate particles. The temperature at which the pH of the reaction liquid is measured is room temperature that is typically around 25° C.

The manner in which urea is decomposed differs depending on whether the reaction liquid is acidic or alkaline, i.e., reaction equation differs. To be more specific, the pH of an aqueous solution of urea is close to neutral, though, it undergoes changes depending on the identity of a metal ion selected or by addition of an acid or base for pH adjustment, and thus the decomposition reaction of urea changes correspondingly. For example, where $Sr(NO_3)_2$ is used as a metal ion source, a decomposition reaction proceeds that takes places in the acidic range.

In the acidic range, thermal decomposition of urea takes place according to the following equation (1) when $Sr(NO_3)_2$ is used as a metal ion source.

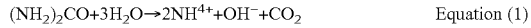

$$(NH_2)_2CO + 3H_2O \rightarrow 2NH_4^+ + OH^- + CO_2 \quad \text{Equation (1)}$$

In the alkali range, hydrolysis of urea takes place according to the following equation (2).

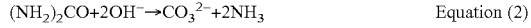

$$(NH_2)_2CO + 2OH^- \rightarrow CO_3^{2-} + 2NH_3 \quad \text{Equation (2)}$$

Carbonate ions ($CO_3^{2-}$) generated as a result of thermal decomposition of urea as shown by the equation (1) or (2) are then reacted with, for example, ionized strontium ions ($Sr^{2+}$) according to the following equation (3) to produce strontium carbonate ($SrCO_3$), a carbonate described above.

$$Sr^{2+} + CO_3^{2-} \rightarrow SrCO_3 \quad \text{Equation (3)}$$

—Liquid in Which Metal Ion Source and Carbonate Ion Source are Reacted Together—

A liquid in which the metal ion source and carbonate ion source are reacted together preferably contains water. Accordingly, such a liquid is preferably an aqueous solution or a suspension.

Moreover, it is preferable add a solvent in the liquid for the purpose of reducing the solubility of the resulting carbonate crystals.

The solvent is not particularly limited and can be appropriately selected depending on the intended purpose; suitable examples include methanol, ethanol and isopropyl alcohol. These solvents may be used singly or in combination.

In addition, the added amount of the solvent is not particularly limited and can be appropriately set depending on the intended purpose; the content of such a solvent is preferably 1% by volume to 80% by volume, more preferably 10% by volume to 80% by volume of the solvent in the solution after production of carbonate particles.

—Physical Properties of Carbonates—

The carbonate particles produced by the process of the present invention are required to have an aspect ratio of greater 1 and, preferably, have needle or rod shapes. The aspect ratio means the ratio of the length of a carbonate particle to its diameter; the greater the aspect ratio, the more preferable.

The average particle length of the carbonate particles is preferably 0.05 μm to 30 μm, more preferably 0.05 μm to 5 μm. An average particle length of greater than 30 μm may result in greater influences of light scattering, which may reduce its practical applicability to optical purposes.

The proportion of carbonate particles having a length of "average particle length ±α" in the total carbonate particles is preferably 60% or more, more preferably 70% or more, further preferably 75% or more and, most preferably, 80% or more. A proportion of 60% or more means that the particle size has been precisely controlled.

Here "α" is preferably 0.05 μm to 2 μm, more preferably 0.05 μm to 1.0 μm, further preferably 0.05 μm to 0.8 μm and, most preferably, 0.05 μm to 0.1 μm.

With respect to the X-ray diffraction spectrum of the carbonate prepared by the process of the present invention, the full-width at half maximum of the diffraction peak corresponding to (111) plane is preferably less than 0.8°. If the full-width is 0.8° or greater, it may result in poor crystallinity and its functions for optical applications may not be exerted sufficiently.

The full-width at half maximum of the diffraction peak corresponding to (111) plane is the full-width of the diffraction peak at its half-height.

—Applications—

The carbonate particles produced by the process of the present invention are particles which have high crystallinity, are less prone to agglomeration, offer orientation birefringence, and have an aspect ratio of greater than 1. In particular, in the case of the carbonate particles that are needle- or rod-shaped, variations in the orientation of particles in the resulting molded article are small and thus the mold article becomes isotropic, making it useful for reinforcing materials for plastics, frictional materials, heat insulating materials, filters, etc. When the carbonate particles are used for shape-changed composite materials such as drawn materials, aligned particles therein can increase their strength and/or improve their optical characteristics.

Moreover, when the carbonate particles, or carbonate crystals, produced by the process of the present invention are dispersed into an optical polymer having a birefringence, followed by a drawing process for allowing linking chains present in the polymer and the carbonate crystals to align in a direction substantially parallel to each other, the birefringence due to the optical anisotropy of the linking chains can be canceled by the birefringence of the carbonate crystals.

The drawing process is not particularly limited; for example, uniaxial drawing can be used. In a case of uniaxial drawing, for example, a drawing machine is used to draw an article to a desired magnification under heat where necessary.

Unique birefringences of some optical polymers are shown by Ide Fumio (Transparent Resins—High-Performance Optical Materials Challenging IT World, Kogyo Chosakai Publishing, Inc., 1st ed, pp. 29.) as listed in the following Table 2. It can be learned from Table 2 that most optical polymers have a positive birefringence value. When strontium carbonate as the foregoing carbonate is added to polycarbonate as the optical polymer, the positive birefringence of the mixture can be reduced to 0, or even under 0. For this reason the optical polymer added with such carbonate particles can be suitably used for optical components, particularly optical elements where polarization characteristics are of importance and high precision is required.

TABLE 2

| Polymers | Unique Birefringence |
| --- | --- |
| Polystyrene | −0.10 |
| Polyphenylene ether | 0.21 |
| Polycarbonate | 0.106 |
| Polyvinyl chloride | 0.027 |
| Polymethyl methacrylate | −0.0043 |
| Polyethylene terephthalate | 0.105 |
| Polyethylene | 0.044 |

According to the process of the present invention for producing carbonate particles, it is possible to efficiently and readily produce carbonate particles which have high crystallinity, are less prone to agglomeration and offer an orientation birefringence, particularly carbonate particles that are needle- or rod-shaped. It is also possible to control the particle size to obtain a high proportion of carbonate particles of a certain size.

Hereinafter, the present invention will be described with reference to Examples and Comparative Examples, which however shall not be construed as limiting the invention thereto.

Example 1

Preparation of Carbonate

As shown in FIG. 1, a strontium nitrate ($Sr(NO_3)_2$) solution as a metal ion source was mixed in a container with a urea (($NH_2)_2CO$) aqueous solution as a carbonate ion source to prepare a mixture solution containing 0.33M strontium nitrate and 0.33M urea. The container having the mixture solution was then placed into a reaction vessel and held at 90° C. for 90 minutes while agitating the mixture, whereby thermal decomposition of urea occurred to produce strontium carbonate crystals as the foregoing carbonate. The agitation was conducted at 500 rpm.

Figure 2:
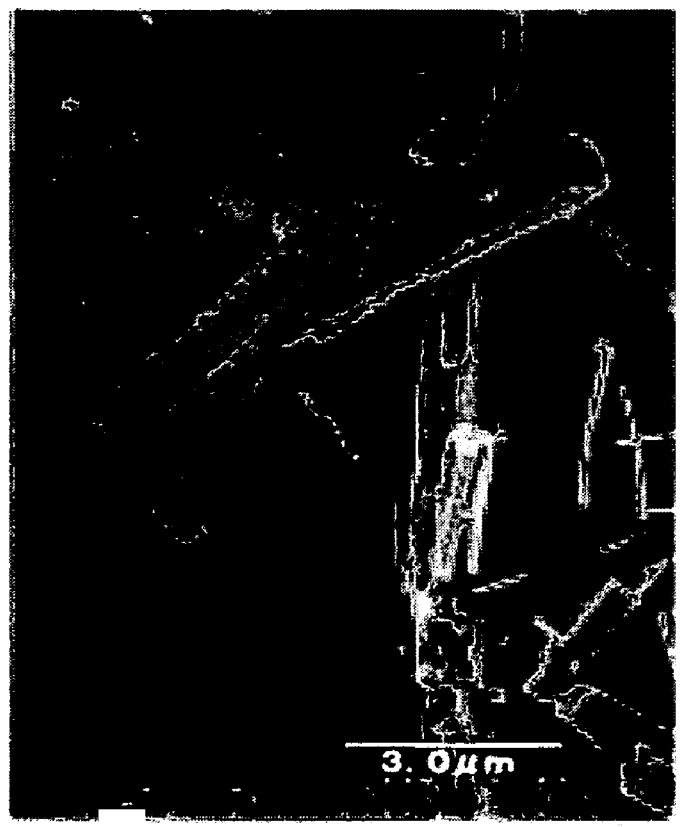
FIG. 2 is an SEM picture of strontium carbonate crystals prepared in Example 1.

The strontium carbonate crystals thus produced were recovered by filtration and dried. The dried strontium carbonate crystals were observed using a scanning electron microscope (S-900 by Hitachi Ltd.). An SEM picture taken at this time is shown in FIG. 2. From this picture it was confirmed that strontium carbonate crystals were obtained that are less agglomerated, have pillar (rod) shapes, and have an average particle length of around 6.2 μm. In addition, the proportion of crystals with a length of average particle length ±α (where α is 0.5 μm) in the total crystals was 62%. The measurement results of various parameters are shown in Table 3.

Figure 3A:
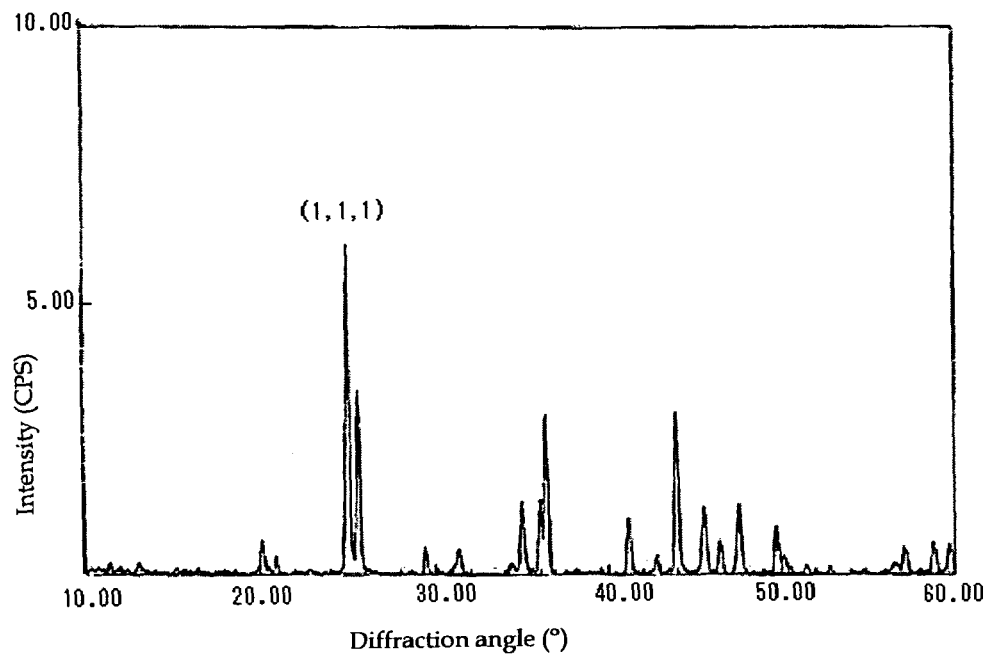
FIG. 3A is an X-ray diffraction spectrum of the strontium carbonate crystals prepared in Example 1.
Figure 3B:
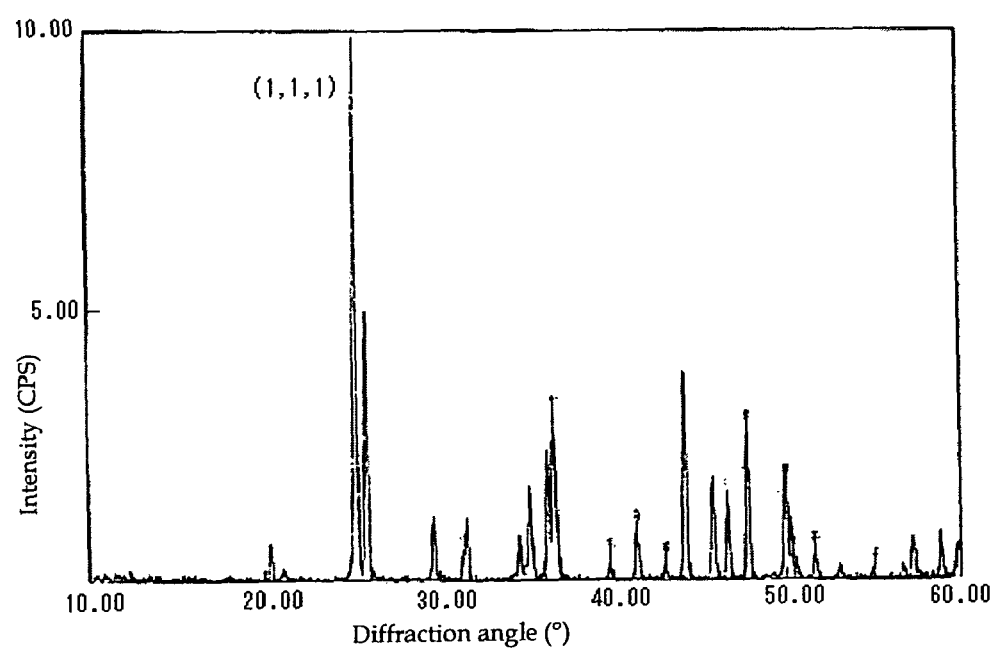
FIG. 3B is an X-ray diffraction spectrum of commercially available strontium carbonate crystals.

The full-width at half maximum of the diffraction peak corresponding to (111) plane was measured using an X-ray diffraction analyzer (CN2013 by Rigaku Corporation). The measurement results are shown in FIG. 3A. The measurement results for commercially available spherical strontium carbonate crystals (strontium carbonate by Wako Pure Chemical Industries Ltd.) are shown in FIG. 3B. From FIGS. 3A and 3B it was confirmed that the crystals prepared in Example 1 were none other than strontium carbonate crystals. The full-width at half maximum of the diffraction peak corresponding to (111) plane was 0.2° both for the commercially available strontium carbonate crystals and for those prepared in Example 1.

Example 2

Process for Producing Carbonate Particles

As shown in FIG. 1, a 0.025M strontium hydroxide ($Sr(OH)_2$) suspension as a metal ion source was mixed in a container with a 0.5M urea (($NH_2)_2CO$) aqueous solution as a carbonate ion source to prepare a mixture solution. The pH of the mixture solution was 12.60. The container having the mixture solution was placed into a reaction vessel and held at 90° C. for 120 minutes while agitating the mixture, whereby thermal decomposition of urea (heating reaction) occurred to produce strontium carbonate crystals as the foregoing carbonate particles. The pH of the liquid after heating reaction, measured at room temperature (25° C.), was reduced to 11.50. The agitation was conducted at 500 rpm.

Figure 4:
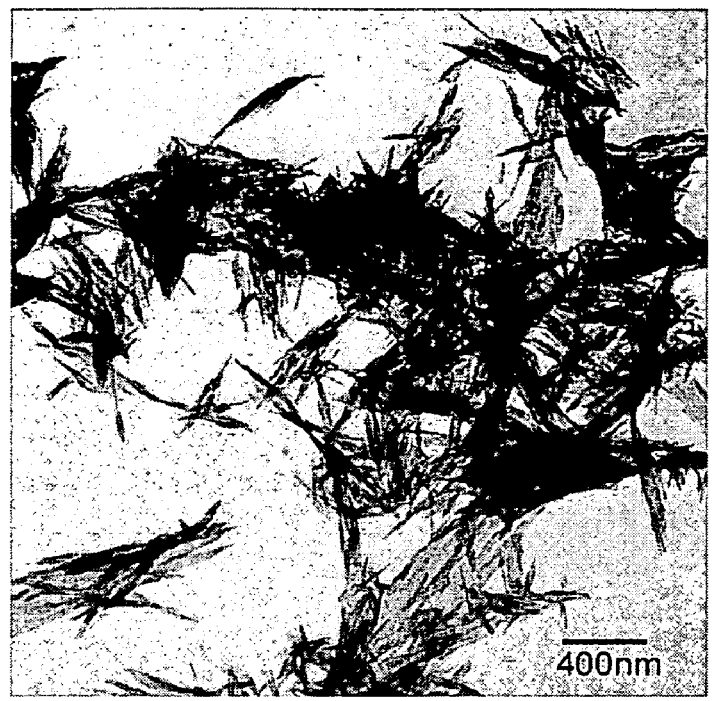
FIG. 4 is a TEM picture of strontium carbonate crystals prepared in Example 2.

The strontium carbonate crystals thus produced were recovered by filtration and dried. The dried strontium carbonate crystals were observed using a transmission electron microscope (JEM-1010 by JEOL Ltd.). A TEM picture taken at this time is shown in FIG. 4, and the measurement results of various parameters are shown in Table 3.

Example 3

Preparation of Carbonate Particles

Carbonate (calcium carbonate) crystals were produced in a manner similar to that described in Example 1, with a calcium chloride solution used as a metal ion source in stead of a strontium nitrate solution. The calcium carbonate crystals thus produced were observed using the SEM. The measurement results of various parameters are shown in Table 3.

Example 4

Preparation of Carbonate Particles

Strontium carbonate crystals were produced in a manner similar to that described in Example 1, with as the foregoing solvent methanol added to the mixture solution from which the strontium carbonate crystals were obtained for the purpose of reducing the solubility of the crystals. The strontium carbonate crystals thus produced were observed using the SEM. The measurement results of various parameters are shown in Table 3.

Example 5

Preparation of Carbonate Particles

A 0.005M strontium nitrate ($Sr(NO_3)_2$) solution was mixed in a container with a 0.5M urea (($NH_2)_2CO$) aqueous solution to prepare a mixture solution. The pH of the mixture solution was 7.53. The container having the mixture solution was then placed into a reaction vessel and held at 90° C. for 120 minutes while agitating the mixture, whereby thermal decomposition of urea (heating reaction) occurred to produce strontium carbonate crystals. The pH of the liquid after heating reaction, measured at room temperature (25° C.), was increased to 8.18. The agitation was conducted at 500 rpm.

Figure 5:
FIG. 5 is an SEM picture of strontium carbonate crystals prepared in Example 5.

The strontium carbonate crystals thus produced were recovered by filtration and dried. The dried strontium carbonate crystals were observed using the SEM. An SEM picture taken at this time is shown in FIG. 5. From this picture it was confirmed that strontium carbonate crystals were obtained that have needle shapes and have an average particle length of around 8.5 μm. In addition, the proportion of crystals with a length of average particle length ±α (where α is 2.0 μm) in the total crystals was 68%. The full-width at half maximum of the diffraction peak corresponding to (111) plane in the X-ray spectrum was 0.8°. The measurement results of various parameters are shown in Table 3.

Comparative Example 1

Preparation of Carbonate Particles

By double jetting, 300 ml of a 1M strontium nitrate (Sr(NO$_3$)$_2$) solution and 300 ml of a 1M urea ((NH$_2$)$_2$CO) aqueous solution were added dropwise to 400 ml of water in which 4.00 g of urease had been dissolved, at an addition rate of 10 ml/min and at a mole-based addition rate of 0.001 mol/min. The resultant mixture was agitated to allow reaction to take place at 25° C. to produce strontium carbonate crystals. The agitation was conducted at 500 rpm.

Figure 6A:
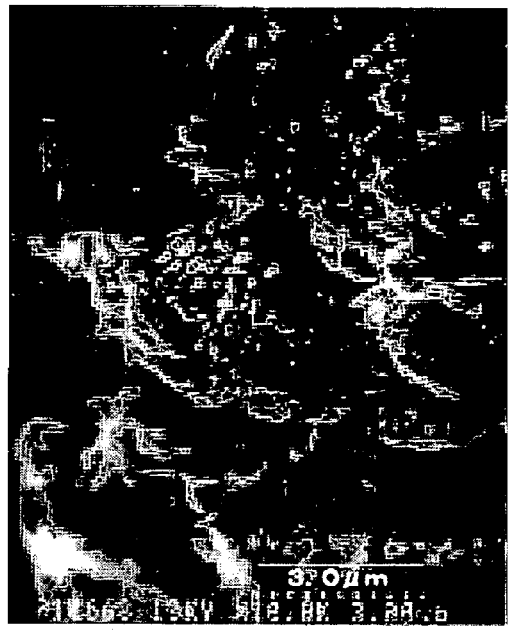
FIG. 6A is a TEM picture of strontium carbonate crystals prepared in Comparative Example 1.
Figure 6B:
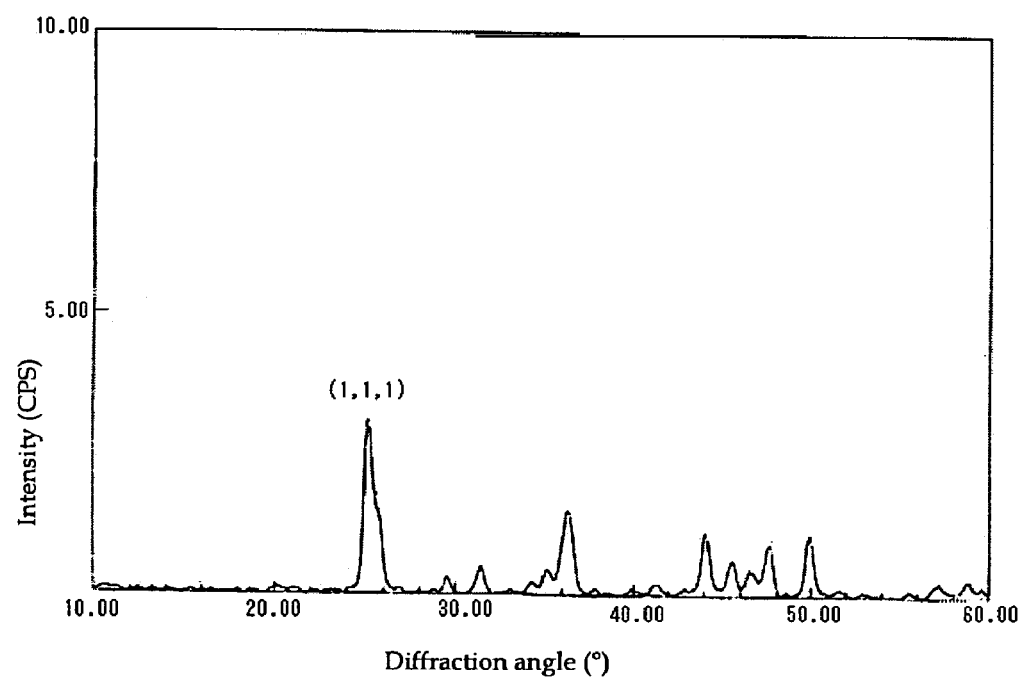
FIG. 6B is an X-ray diffraction spectrum of the strontium carbonate crystals prepared in Comparative Example 1.

The strontium carbonate crystals thus produced were recovered by filtration and dried. The dried strontium carbonate crystals were observed using the TEM. A TEM picture taken at this time is shown in FIG. 6A. From this picture it was confirmed that strontium carbonate crystals were obtained that have spherical shapes and have an average particle length of around 9.0 μm. In addition, the proportion of crystals with a length of average particle length ±α (where α is 1.0 μm) in the total crystals was 63%. The X-ray spectrum of the strontium carbonate crystals as measured by the X-ray diffraction analyzer is shown in FIG. 6B. It was confirmed from this X-ray spectrum that the full-width at half maximum of the diffraction peak corresponding to (111) plane was 0.8°. The measurement results of various parameters are shown in Table 4.

Comparative Example 2

Preparation of Carbonate Particles

Figure 7:
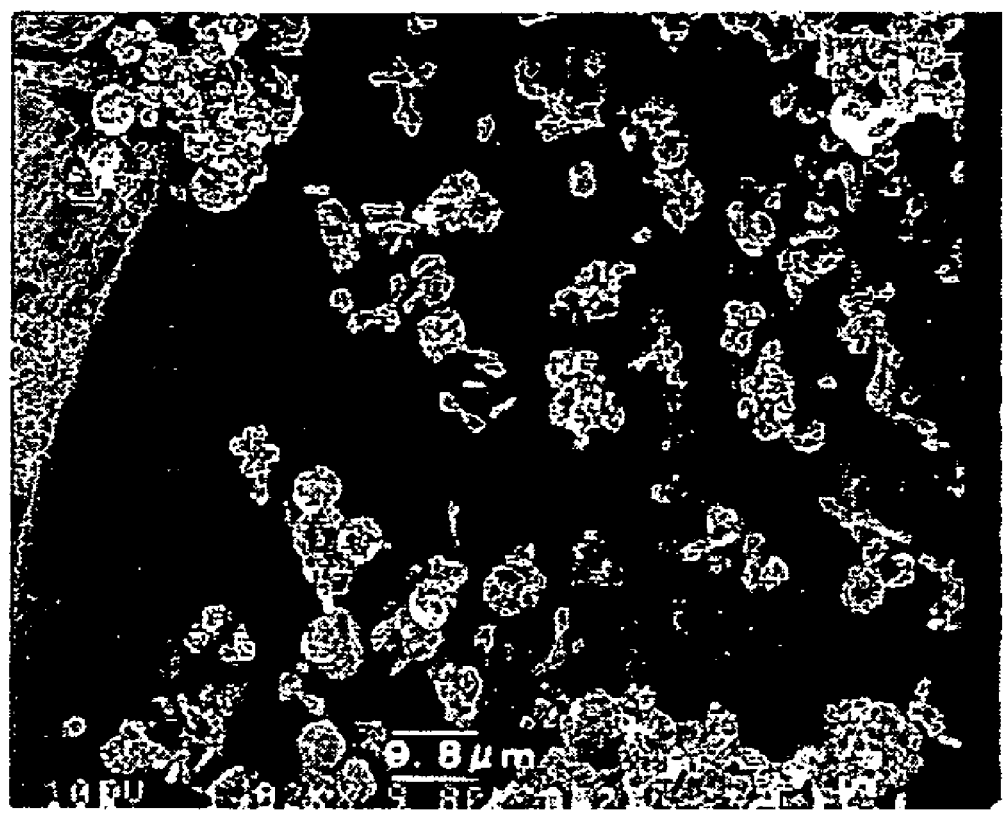
FIG. 7 is an SEM picture of strontium carbonate crystals prepared in Comparative Example 2.

Strontium carbonate crystals were prepared in a manner similar to that described in Comparative Example 1, with as a dispersing agent 3% by mass of gelatin further added in 400 ml of water in which 4.00 g of urease had been dissolved. The obtained strontium carbonate crystals were observed using the SEM. An SEM picture taken at this time is shown in FIG. 7. From this picture it was confirmed that gourd shaped-strontium carbonate crystals were obtained. The measurement results of various parameters are shown in Table 4.

TABLE 3

|  | Ex. 1 | Ex. 2 | Ex. 3 | Ex. 4 | Ex. 5 |
|---|---|---|---|---|---|
| Metal ion source | Sr(NO$_3$)$_2$ | Sr(OH)$_2$ | CaCl$_2$ | Sr(NO$_3$)$_2$ | Sr(NO$_3$)$_2$ |
| Carbonate ion source | (NH$_2$)$_2$CO | (NH$_2$)$_2$CO | (NH$_2$)$_2$CO | (NH$_2$)$_2$CO | (NH$_2$)$_2$CO |
| Solvent | — | — | — | Methanol | — |
| Reaction temp. (° C.) | 90 | 90 | 90 | 90 | 90 |
| Particle shape | Pillar-shaped | Needle-shaped | Pillar-shaped | Pillar-shaped | Needle-shaped |
| Aspect ratio | 4.7 | 6.8 | 3.9 | 8.1 | 5.4 |
| Average particle length (μm) | 6.2 | 0.35 | 2.2 | 4.8 | 8.5 |
| Proportion of carbonate crystals with a length of average particle length ± α (%) | 62 | 84 | 65 | 58 | 68 |
| Full-width at half maximum of diffraction peak (°) | 0.2 | 0.6 | 0.4 | 0.6 | 0.8 |

TABLE 4

|  | Compara. Ex. 1 | Compara. Ex. 2 |
|---|---|---|
| Metal ion source | Sr(NO$_3$)$_2$ | Sr(NO$_3$)$_2$ |
| Carbonate ion source | (NH$_2$)$_2$CO | (NH$_2$)$_2$CO |
| Solution | Urease | Urease Gelatin |
| Addition rate (ml/min) | 10 | 10 |
| Mole-based addition rate (mol/min) | 0.001 | 0.001 |
| Reaction temp. (° C.) | 25 | 50 |
| Particle shape | Spherical | Gourd-shaped |
| Aspect ratio | 1.0 | 2.7 |
| Average particle length (μm) | 9.0 | 6.0 |
| Proportion of carbonate crystals with a length of average particle length ± α (%) | 63 | 44 |
| Full-width at half maximum of diffraction peak (°) | 0.8 | 0.7 |

It was confirmed from the results shown in Tables 3 and 4 that the carbonate particles prepared in Examples 1 to 5 were all highly crystalline, less prone to agglomeration, had needle- or pillar-(rod) shapes, and had an aspect ratio of greater than 1. In particular, it was established that the production process conducted under the reaction condition of Example 2 results in the production of fine needle-shaped carbonate particles with an average particle length of 350 nm. It was also established that the process of all of Examples 1 to 5 can control the particle size and that a high proportion of carbonate particles of a certain size can be obtained.

INDUSTRIAL APPLICABILITY

The process of the present invention for producing carbonate particles can control the particle size and thus can efficiently and readily produce carbonate particles containing a high proportion of carbonate particles of a certain size.

The carbonate particles produced by the process of the present invention are particles which have high crystallinity, are less prone to agglomeration, offer orientation birefringence and have an aspect ratio of greater than 1. In particular, in the case of the carbonate particles that are needle- or rod-shaped, variations in the orientation of particles in the resulting molded article are small and thus the mold article becomes isotropic, making it useful for reinforcing materials for plastics, frictional materials, heat insulating materials, filters, etc. When the carbonate particles are used for shape-changed composite materials such as drawn materials, aligned particles therein can increase their strength and improve their optical characteristics.

Moreover, when the carbonate particles, or carbonate crystals, produced by the process of the present invention are dispersed into an optical polymer having a birefringence followed by a drawing process for allowing linking chains present in the polymer and the carbonate crystals to align in a direction substantially parallel to each other, the birefringence due to the optical anisotropy in the linking chains can be canceled by the birefringence of the carbonate crystals. For this reason the optical polymer added with such carbonate particles can be suitably used for optical components, particularly optical elements where polarization characteristics are of importance and high precision is required.

The invention claimed is:

1. A process for producing carbonate particles, comprising:
heating together a metal ion source and a carbonate ion source in a liquid at 55° C. or higher for reaction to produce carbonate particles with an aspect ratio of greater than 1, by using a hydrolysis of:

$$(NH_2)_2CO + 2OH^- \rightarrow CO_3^{2-} + 2NH_3 \quad \text{Equation (2)},$$

wherein the metal ion source contains at least one metal ion selected from the group consisting of $Sr^{2+}$, $Ca^{2+}$, $Ba^{2+}$, $Zn^{2+}$ and $Pb^{2+}$; and wherein the pH of the liquid before heating is basic, and the pH of the liquid after heating is lowered to 8.20 or more.

2. The process for producing carbonate particles according to claim 1, wherein the carbonate particles are needle- or rod-shaped.

3. The process for producing carbonate particles according to claim 1, wherein the metal ion source contains at least one of $NO_3^-$, $Cl^-$ and $OH^-$.

4. The process for producing carbonate particles according to claim 1, wherein the liquid contains water.

5. The process for producing carbonate particles according to claim 1, wherein the liquid contains a solvent.

6. The process for producing carbonate particles according to claim 5, wherein the solvent is at least one selected from the group consisting of methanol, ethanol, and isopropyl alcohol.

7. The process for producing carbonate particles according to claim 1, wherein in an X-ray diffraction spectrum of the carbonate particles, the full-width at half maximum of the diffraction peak corresponding to (111) plane is less than 0.8°.

8. The process for producing carbonate particles according to claim 1, wherein the average particle length of the carbonate particles is 0.05 μm to 5 μm.

* * * * *